(12) United States Patent
Chendamarai Kannan et al.

(10) Patent No.: US 11,716,758 B2
(45) Date of Patent: Aug. 1, 2023

(54) RECEIVER ASSISTED TRANSMITTER SENSING FOR CHANNEL ACCESS

(71) Applicant: QUALCOMM Incorporated, San Diego, CA (US)

(72) Inventors: Arumugam Chendamarai Kannan, San Diego, CA (US); Vinay Chande, San Diego, CA (US); Srinivas Yerramalli, Hyderabad (IN); Xiaoxia Zhang, San Diego, CA (US); Aleksandar Damnjanovic, Del Mar, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 17/160,058

(22) Filed: Jan. 27, 2021

(65) Prior Publication Data

US 2021/0251004 A1    Aug. 12, 2021

Related U.S. Application Data

(60) Provisional application No. 62/971,759, filed on Feb. 7, 2020.

(51) Int. Cl.
*H04W 74/08* (2009.01)
*H04W 16/28* (2009.01)
*H04W 24/08* (2009.01)
*H04W 16/14* (2009.01)

(52) U.S. Cl.
CPC ....... *H04W 74/0816* (2013.01); *H04W 16/14* (2013.01); *H04W 16/28* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 2017/0070962 A1* | 3/2017 | Wang | H04W 52/247 |
| 2018/0206126 A1* | 7/2018 | Zhang | H04W 72/0406 |
| 2018/0255561 A1* | 9/2018 | Barghi | H04J 11/0026 |
| 2019/0053258 A1* | 2/2019 | Zhang | H04L 5/0055 |
| 2020/0275285 A1* | 8/2020 | Li | H04B 7/02 |
| 2022/0209843 A1* | 6/2022 | Stone | H04W 16/28 |

FOREIGN PATENT DOCUMENTS

WO    WO-2016048798 A1    3/2016

* cited by examiner

*Primary Examiner* — Faruk Hamza
*Assistant Examiner* — Cassandra L Decker
(74) *Attorney, Agent, or Firm* — Norton Rose Fulbright LLP

(57) ABSTRACT

Systems and methods implementing receiver assisted channel access procedures configured to enable access for a potential transmitter while avoiding introducing unacceptable interference with respect to ongoing communications in a shared channel are described. In examples, a receiver assisted channel access procedure implements a LBT enhanced CCA (eCCA) technique in which receiver assisted transmitter sensing is utilized. A receiver assisted channel access procedure may implement monitoring of a shared channel during a contiguous contention period for one or more instances of a periodic session protection signal.

28 Claims, 8 Drawing Sheets

RECEIVER ASSISTED TRANSMITTER SENSING FOR CHANNEL ACCESS

CROSS-REFERENCE TO RELATED APPLICATIONS

This application claims the benefit of U.S. Provisional Patent Application No. 62/971,759, entitled, "RECEIVER ASSISTED TRANSMITTER SENSING FOR CHANNEL ACCESS," filed on Feb. 7, 2020, the disclosure of which is expressly incorporated by reference herein in its entirety.

BACKGROUND

Field

Aspects of the present disclosure relate generally to wireless communication systems, and more particularly, to facilitating channel access using receiver assisted transmitter sensing. Certain examples of the technology discussed below can enable and provide receiver assisted transmitter sensing for millimeter wave channel access.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the $3^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Prior attempts to avoid interference and enable access in congested networks have been to implement a listen before talk (LBT) scheme. Typically, LBT schemes require the potential transmitter to sense an ongoing transmission and backoff until the channel is observed to be clear (i.e., the potential transmitter no longer detects ongoing communication between another transmitter receiver pair in the network). These LBT schemes are not well suited for use with respect to all communications. Millimeter wave (mmWave) communications, for example, have signal propagation properties that are often addressed using highly directional, beamformed transmissions. Although the use of directional links are well suited for providing a good wireless communication link between the devices of a transmitter receiver pair, their use presents challenges with respect to existing LBT schemes. For example, a potential transmitter may be disposed in a position that is not encompassed by the directional communications of a transmitter receiver pair conducing ongoing communications via the channel, but nevertheless will introduce interference with respect to either or both of these devices.

SUMMARY

In one aspect of the disclosure, a method of wireless communication is provided. The method may include receiving, by a receiver device from a first transmitter device, a signal of an ongoing communication session between the receiver device and the first transmitter device. The method may further include transmitting, by the receiver device, a session protection signal during the ongoing communication session. The session protection signal may be configured to provide receiver assisted transmitter sensing with respect to a second transmitter device.

In an additional aspect of the disclosure, an apparatus configured for wireless communication is provided. The apparatus may include means for receiving, by a receiver device from a first transmitter device, a signal of an ongoing communication session between the receiver device and the first transmitter device. The apparatus may further include means for transmitting, by the receiver device, a session protection signal during the ongoing communication session. The session protection signal may be configured to provide receiver assisted transmitter sensing with respect to a second transmitter device.

In an additional aspect of the disclosure, a non-transitory computer-readable medium having program code recorded thereon for wireless communication is provided. The program code may include code to receive, by a receiver device from a first transmitter device, a signal of an ongoing communication session between the receiver device and the first transmitter device. The program code may further include code to transmit, by the receiver device, a session protection signal during the ongoing communication session. The session protection signal may be configured to provide receiver assisted transmitter sensing with respect to a second transmitter device.

In an additional aspect of the disclosure, an apparatus configured for wireless communication is provided. The apparatus includes at least one processor, and a memory coupled to the processor. The processor may be configured to receive, by a receiver device from a first transmitter device, a signal of an ongoing communication session between the receiver device and the first transmitter device. The processor may further be configured to transmit, by the receiver device, a session protection signal during the ongoing communication session. The session protection signal may be configured to provide receiver assisted transmitter sensing with respect to a second transmitter device.

In one aspect of the disclosure, a method of wireless communication is provided. The method may include determining, by a first transmitter device, that transmission is to be provided in a shared spectrum. The method may further include monitoring, by the first transmitter device prior to transmitting in the shared spectrum, for a signal detectable during a contiguous contention period of a receiver assisted channel access procedure. The contiguous contention period may include a plurality (T1) of contiguous contention slots. The method may also include determining that the shared spectrum is unavailable for the transmission when the contiguous contention period is found to include the signal.

In an additional aspect of the disclosure, an apparatus configured for wireless communication is provided. The apparatus may include means for determining, by a first transmitter device, that transmission is to be provided in a shared spectrum. The apparatus may further include means for monitoring, by the first transmitter device prior to transmitting in the shared spectrum, for a signal detectable during a contiguous contention period of a receiver assisted channel access procedure. The contiguous contention period may include a plurality (T1) of contiguous contention slots. The apparatus may also include means for determining that the shared spectrum is unavailable for the transmission when the contiguous contention period is found to include the signal.

In an additional aspect of the disclosure, a non-transitory computer-readable medium having program code recorded thereon for wireless communication is provided. The program code may include code to determine, by a first transmitter device, that transmission is to be provided in a shared spectrum. The program code may further include code to monitor, by the first transmitter device prior to transmitting in the shared spectrum, for a signal detectable during a contiguous contention period of a receiver assisted channel access procedure. The contiguous contention period may include a plurality (T1) of contiguous contention slots. The program code may also include code to determine that the shared spectrum is unavailable for the transmission when the contiguous contention period is found to include the signal.

In an additional aspect of the disclosure, an apparatus configured for wireless communication is provided. The apparatus includes at least one processor, and a memory coupled to the processor. The processor may be configured to determine, by a first transmitter device, that transmission is to be provided in a shared spectrum. The processor may further be configured to monitor, by the first transmitter device prior to transmitting in the shared spectrum, for a signal detectable during a contiguous contention period of a receiver assisted channel access procedure. The contiguous contention period may include a plurality (T1) of contiguous contention slots. The processor may also be configured to determine that the shared spectrum is unavailable for the transmission when the contiguous contention period is found to include the signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
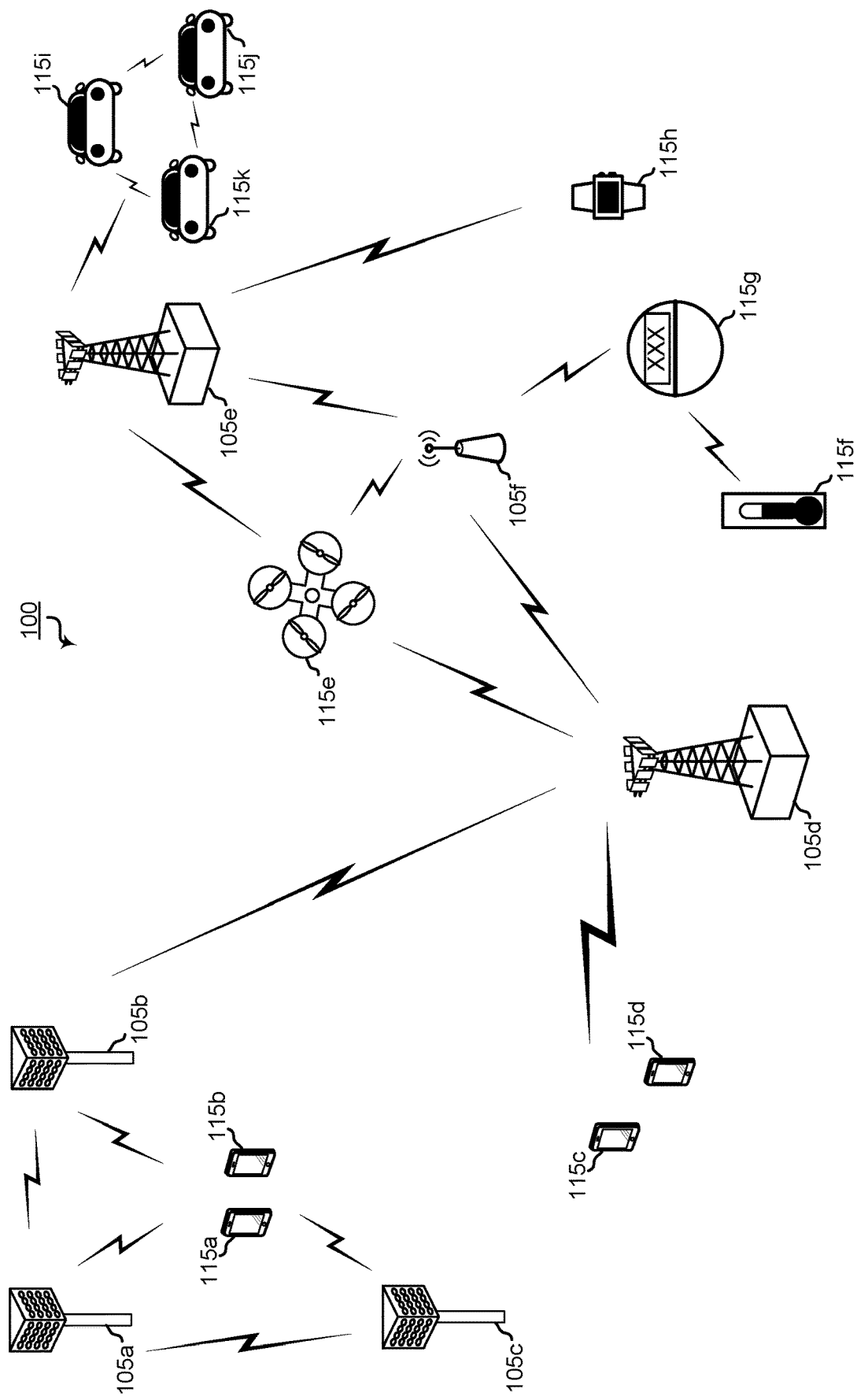
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

Base stations 105 and UEs 115 may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz-300 GHz) which is identified by the International Telecommunications Union (ITU) as a "mmWave" band.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
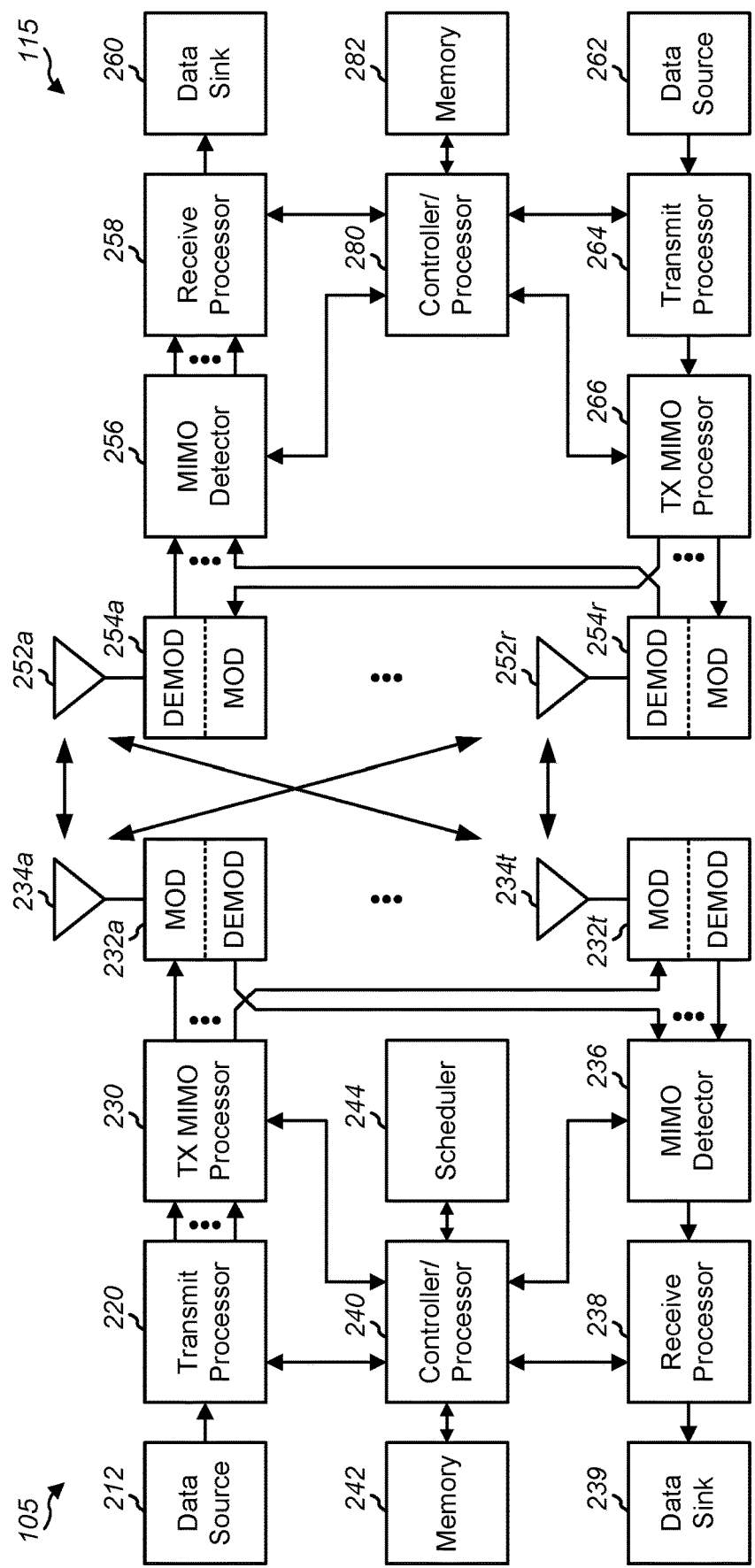
FIG. 2 is a block diagram illustrating a design of a base station and a UE configured according to aspects of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5 and 6, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

The 5G network 100 may, for example, utilized unlicensed shared spectrum, such as in the millimeter wave (mmWave) band of frequencies (e.g., 60 GHz), for facilitating additional capacity and/or bandwidth. Unlike communicating over an exclusive resource (i.e., the resources are reserved), multiple communication devices (e.g., ones of base stations 105 and/or UEs 115) may attempt overlapping access to the channel of the shared spectrum. Examples disclosed herein therefore implement one or more channel access technique configured to enable access for a potential transmitter while avoiding introducing unacceptable interference with respect to one or more ongoing communications in the shared channel. In examples described in further detail below, a receiver assisted channel access procedure implements a LBT enhanced CCA (eCCA) technique in which receiver assisted transmitter sensing is utilized. A receiver assisted channel access procedure according to aspects of the disclosure is configured for use with respect to challenges presented in association with highly directional, beamformed transmissions, such as those of mmWave communications.

Figure 3:
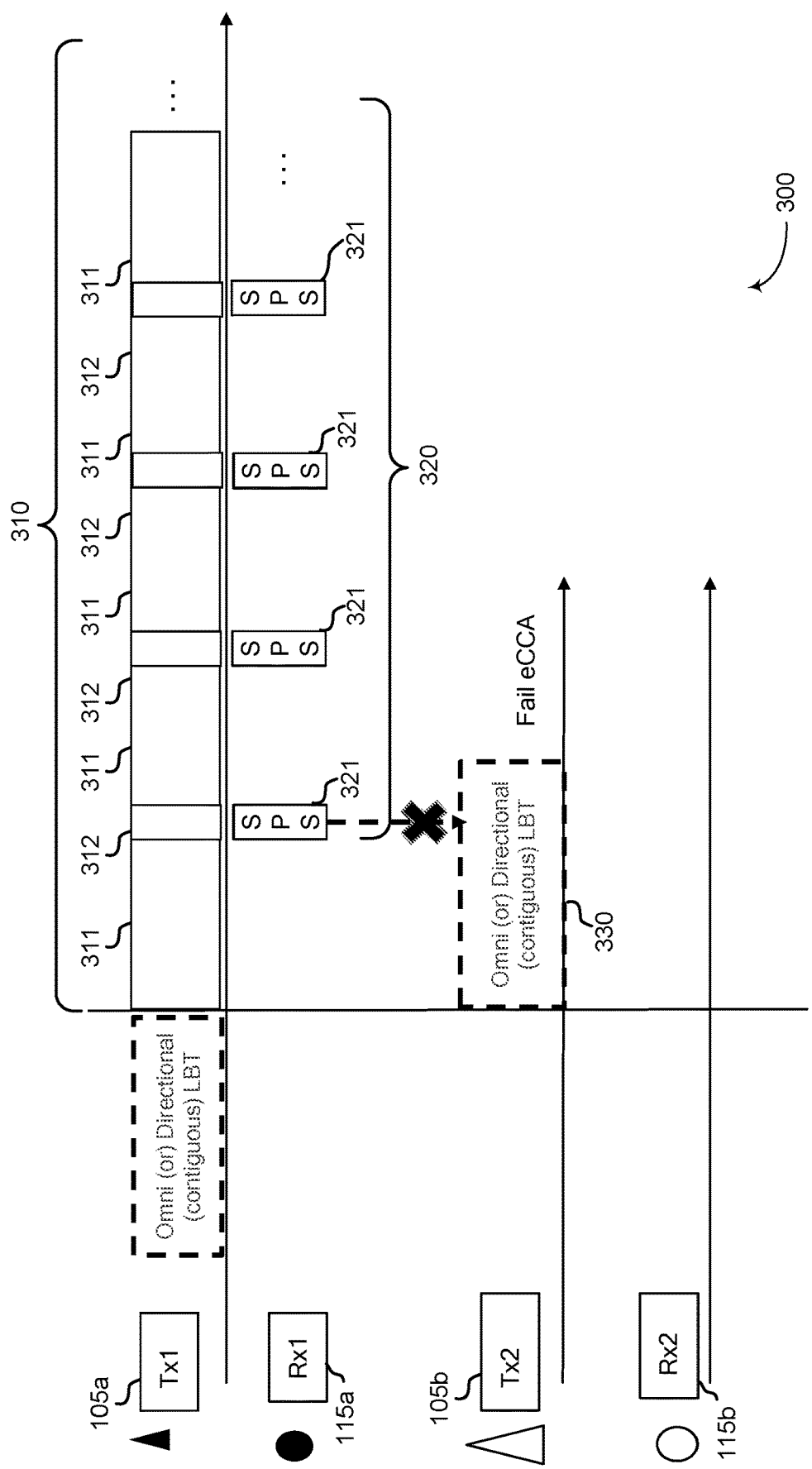
FIG. 3 is a block diagram illustrating implementation of a receiver assisted channel access procedure by communication devices of a wireless network according to aspects of the present disclosure.

FIG. 3 illustrates implementation of receiver assisted channel access procedure 300 by communication devices of the 5G network 100. In the example of FIG. 3, a transmitter receiver pair shown as base station 105a operating as a transmitter device (Tx1) and UE 115a operating as a receiver device (Rx1) are conducting ongoing communication session 310 via the shared channel. The ongoing communication session 310 may, for example, comprise mmWave communications (e.g., carrier frequencies in the range of 60 GHz) provided using highly directional, beamformed transmissions. Base station 105b operating as a potential transmitter device (Tx2) with respect to the shared channel may be positioned (e.g., geographically positioned with respect to a directional signal of the ongoing communications) or otherwise disposed such that base station 105b does not detect transmissions by UE 115a to base station 105a. Additionally or alternatively, base station 105b may be positioned or otherwise disposed such that base station 105b does not detect transmissions by base station 105a to UE 115a. Nevertheless, base station 105b may have an intention to utilize the shared channel to transmit to UE 115b (Rx2), wherein even using highly directional, beamformed transmissions UE 115a may be undesirably or unacceptably interfered (e.g., UE 115a positioned or otherwise disposed in or sufficiently near the directional beam of base station 105b directed to UE 115b that blocking or signal degradation of ongoing communication session 310 is experienced).

Although the example illustrated in FIG. 3 is described above with reference to a base station operating as a transmitter device and a UE operating as a receiver device (e.g., downlink) with respect to an ongoing communication session, it should be understood that the concepts of the present disclosure are applicable to situations in which a UE is operating as a transmitter device and a base station is operating as a receiver device (e.g., uplink). Moreover, the ongoing communication session may comprise downlink and uplink transmissions, wherein receiver assisted transmitter sensing may be provided with respect to either or both link directions (e.g. a UE and/or a base station may provide transmission of a session protection signal with respect to communication session signals received by the respective device). It should be further understood that, although the potential aggressor transmitter device in the example of FIG. 3 is described above with reference to a base station, the concepts of the present disclosure are applicable to situations in which a UE is operating as a potential aggressor transmitter.

It is expected that the potential victim receiver (e.g., UE 115a in the example of FIG. 3) will know its interference neighborhood more accurately than does a potential aggressor transmitter (e.g., base station 105b in the example of FIG. 3) or other communication device of the 5G wireless network 100. The potential aggressor transmitter (e.g., base station 105b) is, however, likely to be the appropriate choice to sense the medium of the shared channel in light of it being the device that will cause interference (e.g., the position of the potential aggressor etc. may be considered when sensing the shared channel). Accordingly, in operation of receiver assisted channel access procedure 300, the potential aggressor transmitter (e.g., base station 105b) performs sensing of the shared channel medium assisted by one or more potential victim receivers (e.g., UE 115a). For example, receiver assisted channel access procedure 300 implemented by communication devices of FIG. 3 is configured to provide receiver assisted transmitter sensing using transmission of a session protection signal 320, as appropriate, by potential victim receivers (i.e., the communication devices that will be subject to interference by the potential aggressor transmitter) of ongoing communication sessions using the shared channel. In operation according to some examples, when one or more instances (e.g., SPS instances 321) of a session protection signal 320 is detected by the potential aggressor transmitter when sensing the medium of the shared channel during a contiguous contention period 330 the channel may be determined to be busy, at least with respect to the intended transmission by the potential transmitter, and thus the intended transmission may be prevented, postponed, etc.

Figure 4:
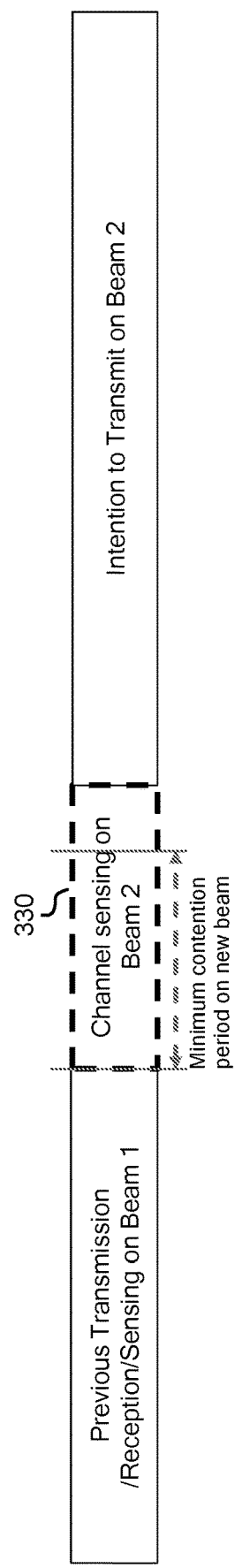
FIG. 4 is a block diagram illustrating monitoring of a shared channel according to a receiver assisted channel access procedure of aspects of the present disclosure.

As shown in FIG. 4, a potential transmitter may perform monitoring of the shared channel according to the receiver assisted channel access procedure 300 of examples when a communication device attempts to access the channel on a given beam direction with an intention to transmit (e.g., before initiating a communication session with another device, each time before switching to new beam with respect to ongoing communications, etc.). While a communication device is engaged in transmission, reception or listening on beam 1, this communication device would likely not be able to monitor any activity on beam 2, unless beam 1 and beam 2 are heavily correlated. In accommodating this "directional deafness," the receiver assisted channel access procedure 300 of examples provides for the communication device monitoring the channel for a period of time (e.g., contiguous contention period 330) to assess availability of the shared channel when the communication device intends to update its transmission beam. For example, monitoring of the shared medium for SPS instances 321 of the session protection signal 320 may be performed by a potential transmitter device each time the potential transmitter device attempts to access the shared channel using an updated beam direction. The updated beam direction may be a beam direction to be utilized by the potential transmitter device for initiating a communication session, a beam direction to be utilized by the potential transmitter device for maintaining an ongoing communication session, etc.

Figures 5, 6:
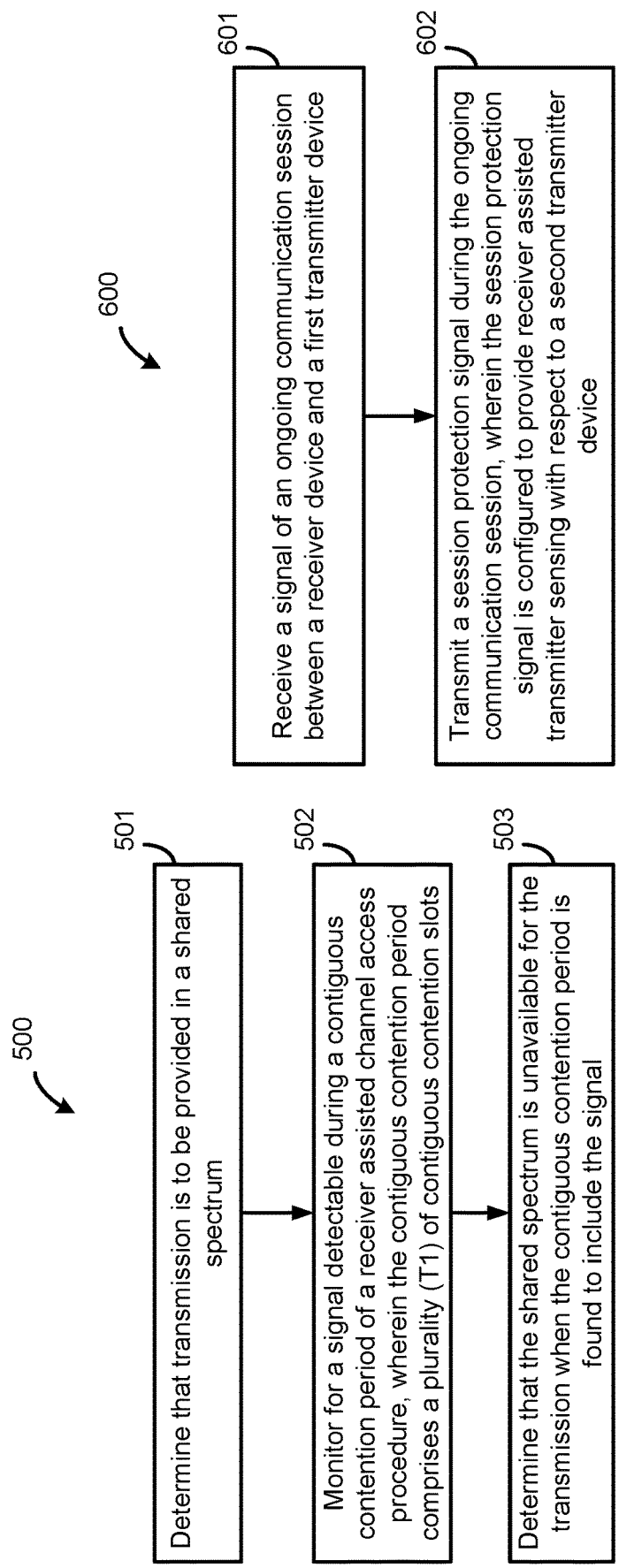
FIGS. 5 and 6 are block diagrams illustrating operation according to a receiver assisted channel access procedure of aspects of the present disclosure.

FIGS. 5 and 6 show flow diagrams setting forth operation of examples of a receiver assisted channel access procedure in accordance with concepts of the disclosure. As described in further detail below, FIG. 5 shows a flow diagram illustrating operation by a potential transmitter device to monitor a shared medium during a contiguous contention period of a receiver assisted channel access procedure prior to transmitting in an updated beam direction. FIG. 6 shows a flow diagram illustrating operation by a potential victim receiver device to transmit a session protection signal during an ongoing communication session using a shared channel.

In accordance with flow 500 of the example illustrated in FIG. 5, a communication device operates to determine that transmission is to be provided in a shared spectrum at block 501 (e.g., using functionality of receiver assisted channel access procedure logic executed by one or more processors, such as transmit processor 220 and/or controller/processor 240 of base station 105, transmit processor 264 and/or controller processor 280 of UE 115, etc.). For example, a potential aggressor transmitter device (e.g., base station 105*b* of FIG. 3) may be operating to initiate a communication session with another communication device (e.g., UE 115*b* of FIG. 3) in a shared spectrum, wherein transmission is to be initiated using a particular beam direction (e.g., Beam 2 of FIG. 4) thus being an updated beam direction. Similarly, a potential aggressor transmitter device (e.g., base station 105*b* of FIG. 3) may be conducting an ongoing communication session with another communication device (e.g., UE 115*b* of FIG. 3) in a shared spectrum, wherein transmission is to be transitioned from a first beam direction (e.g., Beam 1 of FIG. 4) to another beam direction (e.g., Beam 2 of FIG. 4) thus being an updated beam direction.

An example receiver assisted channel access procedure provided according to flow 500 provides for monitoring of the shared channel when a communication device attempts to access the channel on a given beam direction with an intention to transmit. Accordingly, at block 502, a communication device operates to monitor for a signal detectable during a contiguous contention period of a receiver assisted channel access procedure (e.g., using functionality of receiver assisted channel access procedure logic executed by one or more processors, such as receive processor 238 and/or controller/processor 240 of base station 105, receive processor 258 and/or controller processor 280 of UE 115, etc.), wherein the contiguous contention period comprises a plurality (T1) of contiguous contention slots. For example, every time a potential transmitter aggressor device (e.g., base station 105*b* of FIG. 3) attempts to access the shared channel on an updated (e.g., new, reconfigured, redirected, etc.) beam direction with an intention to transmit, prior to transmitting in the updated beam direction, the potential transmitter aggressor device may monitor the shared channel for ongoing activity along that beam direction (e.g., performing a receive operation) for a contiguous contention period (e.g., contiguous contention period 330 of FIG. 3) comprising a minimum of T1 contiguous contention slots.

In accordance with examples of receiver assisted transmitter sensing procedure, a potential transmitter senses the medium of a shared channel for contiguous contention period. The contiguous contention period of some examples comprises a minimum of T1 contention slots up to a maximum of T2 contention slots, T1>0 and T2>T1. A session protection signal for which the potential transmitter is monitoring in the contiguous contention period may, for example, comprise a periodic signal transmitted by a potential victim receiver with a periodicity corresponding to the minimum of T1 contention slots (e.g., a period of T1, a downsampled rate based upon T1 contention slots, such as 2*T1, 3*T1, etc.). By monitoring the shared channel for the contiguous contention period of a minimum of T1 contention slots, detection of a session protection signal (if transmitted by a potential victim receiver having a periodicity corresponding to the minimum of T1 contention slots) by the potential transmitter device is optimized if not ensured. Because transmission in the updated beam direction by the potential transmitter of examples is postponed until shared channel is monitored for the contiguous contention period, the contiguous contention period may essentially provide a congestion "back off" period for the respective transmitter device. Where a plurality of potential aggressor transmitter devices are operating according to a receiver assisted channel access procedure of examples of the disclosure, these transmitter devices may implement contiguous contention periods of varying durations (e.g., contiguous contention periods comprising different numbers of contention slots from a minimum of T1 contention slots to a maximum of T2 contention slots).

A minimum number of contention slots (T1) and/or maximum number of contention slots (T2) may be selected based upon various considerations with respect to operation of the wireless network, the potential aggressor transmitter, the potential victim receiver, the ongoing communication session, etc. For example, a minimum number of contention slots (T1) and/or maximum number of contention slots (T2) may be selected to define contiguous contention periods of sufficiently short duration so as to not introduce unacceptable delay in initiating transmission on an updated beam direction. Additionally or alternatively, a minimum number of contention slots (T1) may be selected to facilitate sufficient periods of communication with respect to ongoing communication sessions without the gaps or interruption of a session protection signal. A maximum number of contention slots (T2) may additionally or alternatively be selected to provide a sufficient spread of different contiguous contention period durations for accommodating a plurality of potential transmitters without resulting in unacceptable congestion accessing the shared channel.

The receiver assisted channel access procedure of examples of flow 500 shown in FIG. 5 provides for the potential transmitter monitoring the shared channel for a contiguous contention period to assess availability of the shared channel when the communication device intends to update its transmission beam. Accordingly, at block 503, a communication device operates to determine that the shared spectrum is unavailable for the transmission when the contiguous contention period is found to include the signal. For example, a communication device may operate to determine that the shared spectrum is unavailable for the transmission when a predetermined number (K)) of contention slots is found to include the signal, or determine that the shared spectrum is available for the transmission when less than the predetermined number (K) of the contention slots is found to include the signal (e.g., using functionality of receiver assisted channel access procedure logic executed by one or more processors, such as transmit processor 220 and/or controller/processor 240 of base station 105, transmit processor 264 and/or controller processor 280 of UE 115, etc.). If, for example, a minimum of K contention slots (e.g., K=1, 2, . . . ) of the contiguous contention period are found to be busy, then the contention is assessed to be a failure and the potential transmitter does not transmit on the updated beam direction using the shared channel. However, if fewer than K contention slots of the contiguous contention period are found to be busy, then the contention is assessed to be a success and the potential transmitter may proceed to occupy (e.g., for some period of time, such as the next N milliseconds) the shared channel on the updated beam direction. Thus, according to some examples, the receiver assisted channel access sensing over the duration of the contiguous contention period is successful only when the shared medium is only busy less than a threshold number of contention slots (e.g., K slots, such as may correspond to a minimum duration of an instance of a session protection signal) out of the contiguous contention period.

In assessing contention according to examples of a receiver assisted channel access procedure, if any K contention slots are found to be busy during the contiguous contention period the medium may be declared to be busy or otherwise unavailable for transmission on an updated beam by a potential transmitter. In another example, if any K contiguous contention slots are found to be busy during the contiguous contention period the medium may be declared to be busy or otherwise unavailable for transmission on an updated beam by a potential transmitter. In yet another example, if any pre-defined energy pattern (e.g., a pattern of high energy/low energy, such as on-off-on, on-on-off-on, etc., where each on/off represents the outcome for a contention slot) is detected during the contiguous contention period the medium may found to be busy or otherwise unavailable for transmission on an updated beam by a potential transmitter.

In accordance with flow 600 of the example illustrated in FIG. 6, a communication device operates to receive a signal of an ongoing communication session between a receiver device and a first transmitter device at block 601 (e.g., using functionality of receiver assisted channel access procedure logic executed by one or more processors, such as receive processor 238 and/or controller/processor 240 of base station 105, receive processor 258 and/or controller processor 280 of UE 115, etc.). For example, a receiver device (e.g., UE 115a of FIG. 3) operable with respect to an ongoing communication session (e.g., ongoing communication session 310 of FIG. 3) with a corresponding transmitter device (e.g., base station 105a of FIG. 3) may receive a signal of the ongoing communication session.

At block 602 of the illustrated example of flow 600, a communication device operates to transmit a session protection signal (e.g., one or more session protection signal instances of SPS instances 321 of FIG. 3) during the ongoing communication session (e.g., using functionality of receiver assisted channel access procedure logic executed by one or more processors, such as transmit processor 220 and/or controller/processor 240 of base station 105, transmit processor 264 and/or controller processor 280 of UE 115, etc.), wherein the session protection signal is configured to provide receiver assisted transmitter sensing with respect to a second transmitter device. For example, a second transmitter device (e.g., base station 105b of FIG. 3) may have an intent to transmit a signal to another communication device (e.g., UE 115b of FIG. 3) on an updated beam direction using the shared channel, and thus may be a potential aggressor transmitter device with respect to a receiver device (e.g., UE 115a of FIG. 3) of the ongoing communication session. Accordingly, the receiver device may be a potential victim receiver and operate to protect the ongoing communication session through transmission of a session protection signal of the receiver assisted channel access procedure of examples herein.

The session protection signal is configured to provide receiver assisted transmitter sensing with respect to a potential aggressor transmitter device (e.g., base station 105b of FIG. 3). In accordance with some examples, the session protection signal may comprise a periodic signal having a period selected to at least in part configure the periodic session protection signal to provide the receiver assisted transmitter sensing. A periodic session protection signal utilized according to examples of a receiver associated channel access procedure may comprise a signal with a periodicity corresponding to a contiguous contention period implemented by potential transmitter devices. For example, a period of the periodic session protection signal may correspond to minimum number of contention slots (T1) of the contiguous contention period (e.g., a period of T1, a downsampled rate based upon T1 contention slots, such as 2*T1, 3*T1, etc.). Additionally or alternatively, a duration of instances of the session protection signal is selected to at least in part configure the session protection signal to provide the receiver assisted transmitter sensing. For example, a duration of SPS instances 321 of the session protection signal 320 of some examples is at least K contention slots, wherein K may be selected to correspond to a channel assessment performed by a potential aggressor transmitter according to an example of the receiver assisted channel access procedure. Further examples of aspects that may be selected to at least in part configure the session protection signal to provide the receiver assisted transmitter sensing include a transmission power of the session protection signal, a sequence transmitted within instances of the session protection signal, a payload transmitted within instances of the session protection signal, etc.

A session protection signal provided for receiver assisted transmitter sensing of examples herein may be provided in various forms. Session protection signals of examples herein may, for example, include energy based signals, message base signals, etc.

In an energy based signal example, a session protection signal may comprise a transmission with the criteria being that it is received having an energy magnitude greater than or equal to a predetermined threshold value (e.g., ≥X dBm). Session protection signals having such an energy based configuration facilitate energy detection by a potential transmitter implementing a receiver assisted channel access procedure.

In an example of a message based signal, a session protection signal may additionally or alternatively comprise one or more sequences transmitted within instances of the session protection signal. For example, a predefined sequence (e.g., a receiver signature sequence) which can be transmitted only by a communication device operating primarily as a receiver device in an ongoing communication session may be utilized in a session protection signal, such as to provide protection of the continuing communication session receiver. Correspondingly, a predefined sequence (e.g., a transmitter signature sequence) which can be transmitted only by a communication device operating primarily as a transmitter device in an ongoing communication session may be utilized in a session protection signal, such as to provide protection of ACK/NACK when the transmitter device turns to reception mode. A predefined radio access technology (RAT) specific sequence (e.g., a RAT specific signature sequence) which can be transmitted only by communication devices belonging to a particular RAT may additionally or alternatively be utilized in a session protection signal, such as to facilitate different operation by the receiver assisted channel access procedure based upon RAT. For example, a communication device operable according to a NR unlicensed (NR-U) RAT may look for a sequence from another RAT (e.g., 802.11ad) and respond differently, use a different threshold inter-RAT compared to intra-RAT, etc. As another example, a pre-defined operator specific sequence (e.g., operator specific signature sequence) which can be transmitted only by communication devices belonging to an operator may additionally or alternatively be utilized in a session protection signal, such as to facilitate different operation by the receiver assisted channel access procedure based upon operator. For example, one or more potential transmitter devices (e.g., communication devices for a particular operator) may back off to session protection signals from another operator but ignore reservation signals from the same operator.

In addition to or in the alternative to the foregoing, a session protection signal may include one or more network signal, such as an SRS transmission, a PUCCH transmission, a Reservation-RS (RRS), etc., as payload. For example, potential transmitter devices may utilize such payload in determining if the intended transmission will unacceptably interfere with the ongoing communication (e.g., using the SRS transmission for determining the channel conditions between the potential transmitter and the potential victim receiver, using the PUCCH transmission and/or RRS for determining timing, communication resources, etc. of the ongoing communication).

Transmission of a session protection signal by a potential victim receiver device may be performed autonomously by the potential victim receiver device. However, autonomous transmission of a session protection signal by a receiver device of an ongoing communication session may result in one or more gaps in data reception by the receiver device. For example, while a communication device (e.g., UE 115*a*) is engaged in transmission of a session protection signal (e.g., any one of the SPS instances 321 of session protection signal 320), this communication device would likely not be able to receive the signal of an otherwise ongoing communication session (e.g., ongoing communication session 310). Accordingly, in operation according to a receiver assisted channel access procedure of some examples, the communication device transmitting the session protection signal may provide signaling or otherwise operate to facilitate recovery of data corresponding to gaps in reception of data of the ongoing communication session. For example, a potential victim receiver device (e.g., UE 115*a*) may indicate with a following PUCCH that the transport block/code-block group (s) were lost due to session protection signal transmission. Such signaling may be different from regular NACK indication, such as to prevent or avoid reconfiguration of the ongoing communication session link (e.g., due to an erroneous determination that congestion or other channel issues caused the data loss).

Some examples of a receiver assisted channel access procedure provide coordination, between the communication devices of an ongoing communication session, with respect to a session protection signal. For example, base stations may utilize receiver assisted channel access control and configuration functionality of receiver assisted channel access procedure logic for coordination with respect to a session protection signal. Interference in beamformed systems can be highly directional and thus UEs of examples of a receiver assisted channel access procedure may report interference to, and/or request receiver assisted transmitter sensing configuration be provided by, the base station so that the base station may configure the UE to transmit a session protection control signal to protect itself. Some such examples thus may provide for on-demand session protection signal transmission (e.g., a potential victim receiver triggers session protection signal configuration only if needed). In accordance with some examples, a potential aggressor transmitter may, nevertheless, always perform sensing of the receiver assisted channel access procedure but shared medium losses due to silencing (e.g., gaps 312 of FIG. 3) can be reduced significantly.

In a situation where a UE is a potential victim receiver device (e.g., ongoing communication session downlink), the base station may configure a UE such that one or more gaps (e.g., gaps 312 of FIG. 3) corresponding to transmission of the session protection signal (e.g., corresponding to a periodicity of the session protection signal, such as every T1 contention slots, where a periodic session protection signal is implemented) are expected with respect to the ongoing communication session. Correspondingly, the base station may not provide transmission of the ongoing communication session signal in the downlink in these gaps, whereby instances of the ongoing communication signal (e.g., instances 311 of FIG. 3) are transmitted. The UE operating as a receiver device in the ongoing communication session is thus allowed to transmit instances of a session protection signal during one or more of these gaps without loss of downlink data.

Operation with respect to a session protection signal may be variously configured for a downlink of an ongoing communication session according to examples of a receiver assisted channel access procedure. For example, a configuration may be implemented (e.g., by receiver assisted channel access control and configuration logic of a base station) such that a UE shall transmit a session protection signal (e.g., based on a UE reporting interference, strong interference, etc.). Alternatively, a configuration may be implemented (e.g., by receiver assisted channel access control and configuration logic of a base station) such that a UE may optionally transmit a session protection signal (e.g., the UE may not detect a strong enough interferer and thus may choose to save power with respect to transmission of a session protection signal).

In a situation where the base station is a potential victim receiver device (e.g., ongoing communication session uplink), the base station may choose to transmit a session protection signal. For example, in the case of uplink communication, the interference environment at the base station receiver is known by the base station and thus the base station may configure operation with respect to a session protection signal to protect itself. The base station may, for example, implement on-demand session protection signal configuration and/or transmission, such as to provide session protection signal transmission only for links that potentially see interference.

Operation with respect to a session protection signal may be variously configured for an uplink of an ongoing communication session according to examples of a receiver assisted channel access procedure. For example, a configuration may be implemented (e.g., by receiver assisted channel access control and configuration logic of a base station) such that a session protection signal may be transmitted by the base station and the UE shall rate match around those resources (e.g., based on a base station observation of interference environment). Alternatively, a configuration may be implemented (e.g., by receiver assisted channel access control and configuration logic of a base station) such that a base station autonomously transmits a session protection signal even when not configured (e.g., creating a gap in uplink data reception). The base station may provide signaling (e.g., indicating in the following PDCCH that the transport block/code-block group(s) were lost due to session protection signal transmission) to facilitate recovery of data corresponding to gaps in reception of data of the ongoing communication session. Such signaling may be different from regular NACK indication, such as to prevent or avoid reconfiguration of the ongoing communication session link (e.g., due to an erroneous determination that congestion or other channel issues caused the data loss). Additionally or alternatively, the base station may indicate using a "pre-emption" type indication that a previously issued grant will have an interruption in uplink reception due to session protection signal transmission.

Figure 7:
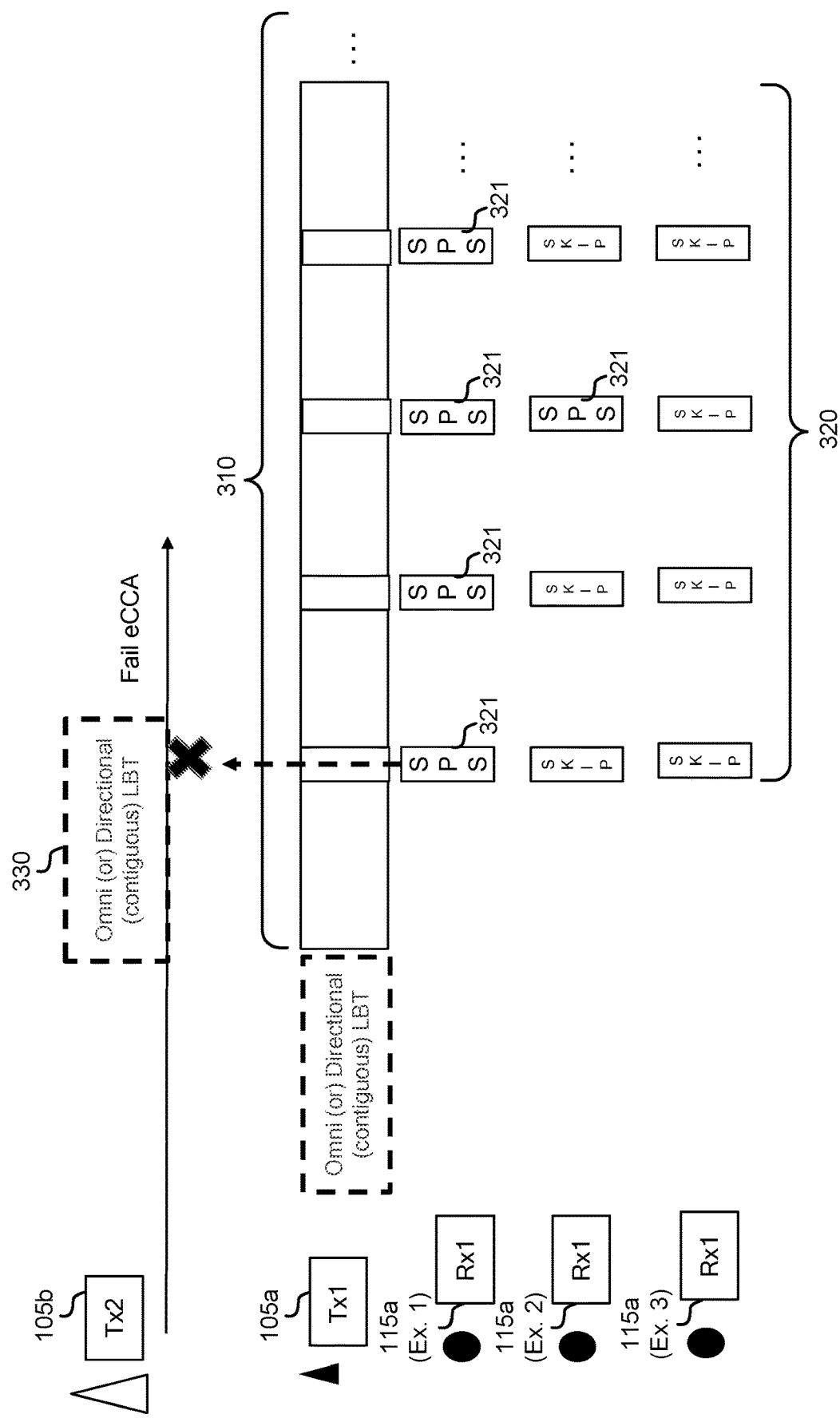
FIG. 7 is a block diagram illustrating examples with respect to a session protection signal of a receiver assisted channel access procedure according to aspects of the present disclosure.

FIG. 7 shows several examples with respect to a session protection signal as may be implemented by a receiver assisted channel access procedure. According to the first example of FIG. 7, the potential victim receiver device (e.g., UE 115a operating as a receiver in ongoing communication session 310) transmits a periodic session protection signal wherein the SPS instances 321 of the session protection signal 320 have a period of T1 (i.e., the duration of the minimum number of contention slots of the contiguous contention period). Implementations in accordance with this example (Ex. 1) optimize detection of the session protection signal by the potential transmitter device at the potential cost of increased power consumption, increased utilization of communication resources of the communication device, etc. In the second example of FIG. 7, the potential victim receiver device transmits a periodic session protection signal wherein the SPS instances 321 of the session protection signal 320 have a period of 3*T1 (i.e., a downsampled rate based upon the minimum number of contention slots of the contiguous contention period). Implementations in accordance with this example (Ex. 2) facilitate probabilistic silencing of an potential transmitter at the potential cost of link quality and/or link adaptation, although potentially conserving power, communication resource utilization, etc. The third example of FIG. 7 (Ex. 3) illustrates a situation in which the potential victim receiver device elects not to transmit the SPS instances 321 of the session protection signal 320, such as where no interference from an aggressor transmitter is experienced or is in the vicinity, such as to conserve power, communication resources, etc.

Figure 8:
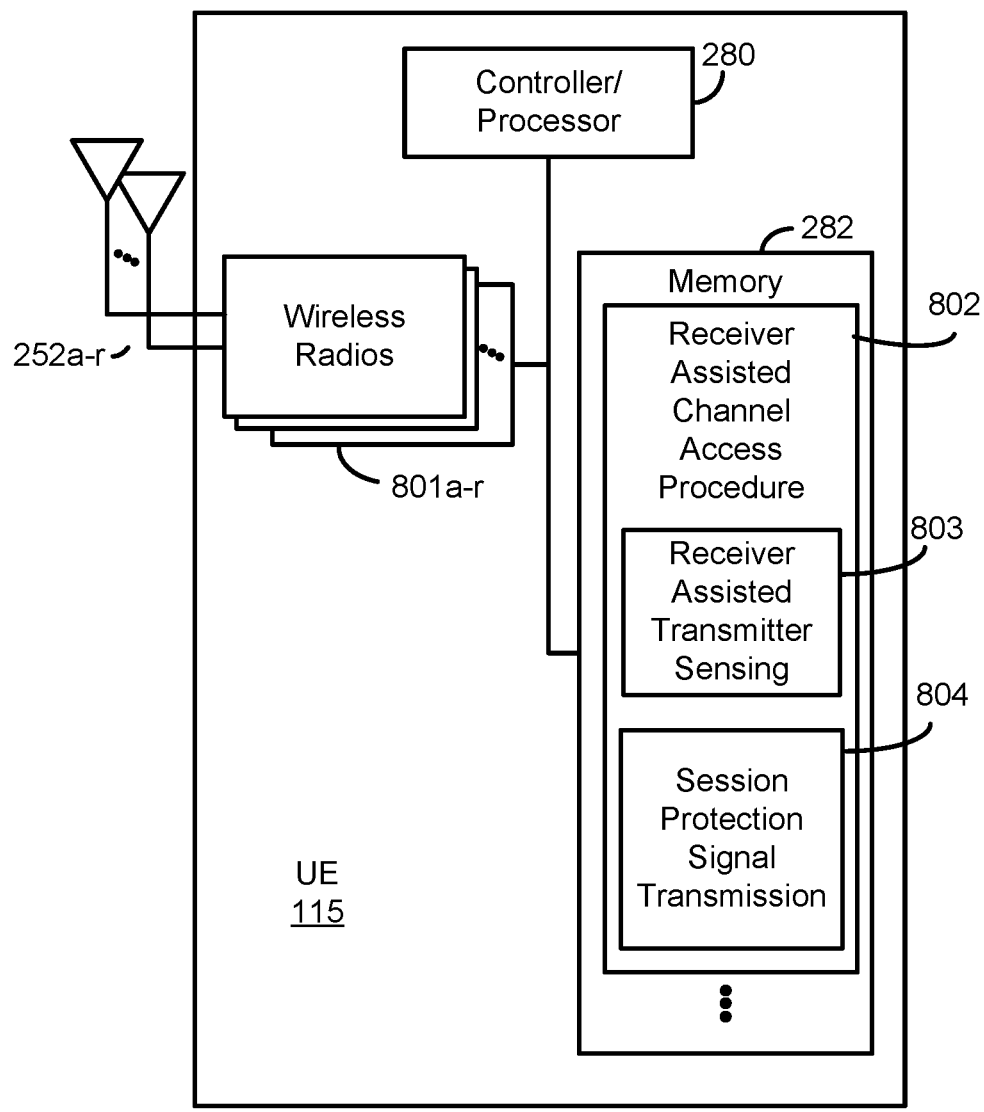
FIG. 8 is a block diagram illustrating a design of a UE configured for operation of a receiver assisted channel access procedure according to aspects of the present disclosure.

FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801a-r and antennas 252a-r. Wireless radios 801a-r include various components and hardware, as illustrated in FIG. 2 for UE 115, including modulator/demodulators 254a-r, MIMO detector 256, receive processor 258, transmit processor 264, and TX MIMO processor 266. UE 115 is configured to provide operation to implement functionality of a receiver assisted channel access procedure in accordance with concepts herein. For example, instructions of receiver assisted channel access procedure logic 802 may be executed by controller/processor 280, transmit processor 264, and/or receive processor 258 to provide operation as described herein. Receiver assisted transmitter sensing logic 803 of receiver assisted channel access procedure logic 802 may, for example, perform and/or control monitoring for a signal, determining channel medium availability, and/or other functionality described above with respect to flow 500 of FIG. 5. Additionally or alternatively, session protection signal transmission 804 of receiver assisted channel access procedure logic 802 may perform and/or control transmission of a session protection signal and/or other functionality described above with respect to flow 600 of FIG. 6.

Figure 9:
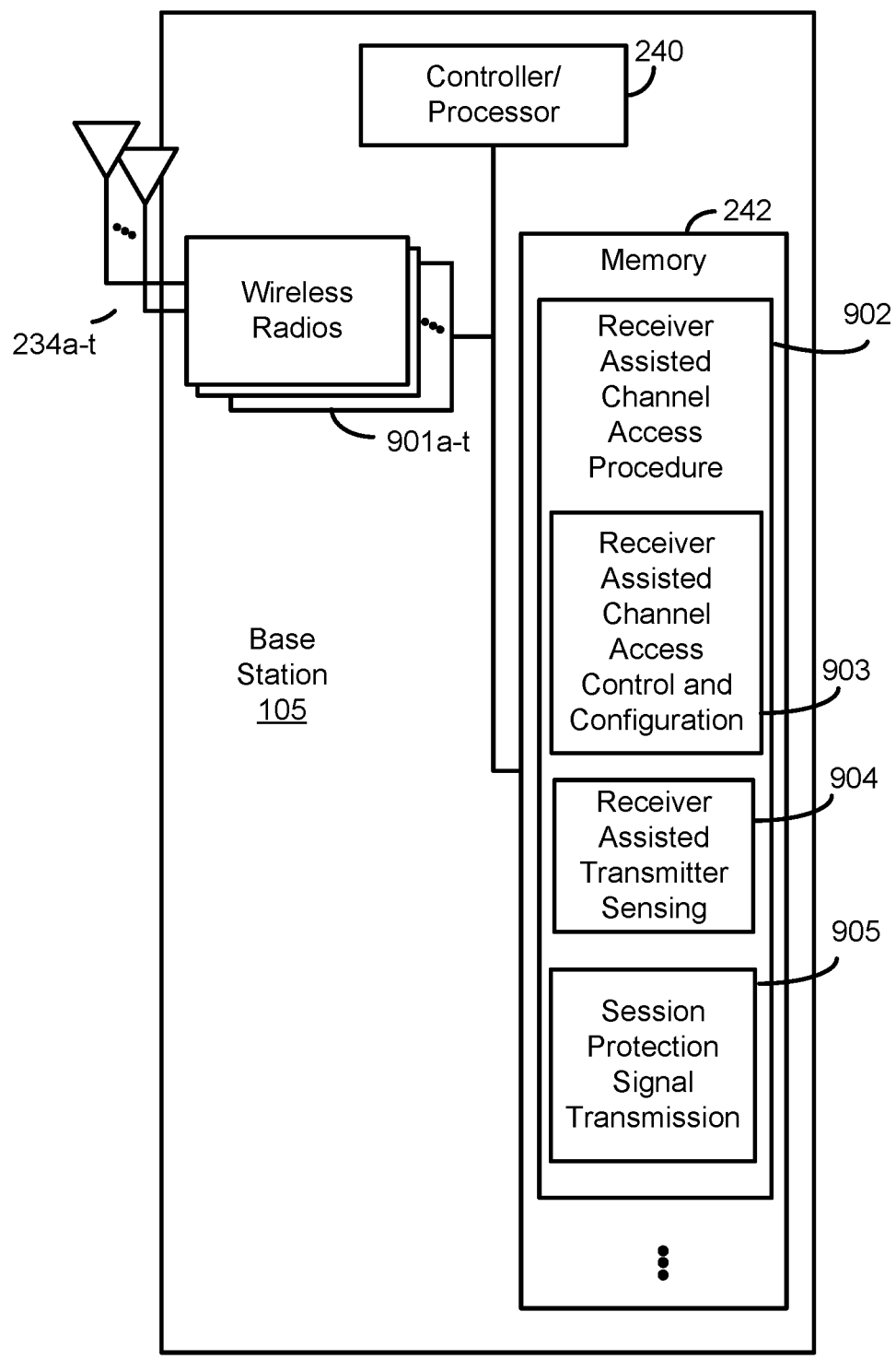
FIG. 9 is a block diagram illustrating a design of a base station configured for operation of a receiver assisted channel access procedure according to aspects of the present disclosure.

FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 901a-t and antennas 234a-t. Wireless radios 901a-t include various components and hardware, as illustrated in FIG. 2 for base station 105, including modulator/demodulators 232a-t, MIMO detector 236, receive processor 238, transmit processor 220, and TX MIMO processor 230. Base station 105 is configured to provide operation to implement functionality of a receiver assisted channel access procedure in accordance with concepts herein. For example, instructions of receiver assisted channel access procedure logic 902 may be executed by controller/processor 240, transmit processor 220, and/or receive processor 238 to provide operation as described herein. Receiver assisted channel access control and configuration logic 903 may, for example, provide control and configuration functionality for coordination with respect to a session protection signal, as described above. Receiver assisted transmitter sensing logic 904 of receiver assisted channel access procedure logic 902 may perform and/or control monitoring for a signal, determining channel medium availability, and/or other functionality described above with respect to flow 500 of FIG. 5. Additionally or alternatively, session protection signal transmission 905 of receiver assisted channel access procedure logic 902 may perform and/or control transmission of a session protection signal and/or other functionality described above with respect to flow 600 of FIG. 6.

In some examples of methods, apparatuses, and articles described herein, various aspects of receiver assisted transmitter sensing techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for receiving, by a receiver device from a first transmitter device, a signal of an ongoing communication session between the receiver device and the first transmitter device, and transmitting, by the receiver device, a session protection signal during the ongoing communication session, wherein the session protection signal is configured to provide receiver assisted transmitter sensing with respect to a second transmitter device.

2. The methods, apparatuses, and articles of clause 1, wherein the session protection signal comprises a periodic signal having a periodicity selected to at least in part configure the periodic session protection signal.

3. The methods, apparatuses, and articles of any of clauses 1-2, wherein a duration of instances of the session protection signal is selected to at least in part configure the session protection signal.

4. The methods, apparatuses, and articles of any of clauses 1-3, wherein a transmission power of the session protection signal is selected to at least in part configure the session protection signal.

5. The methods, apparatuses, and articles of any of clauses 1-4, wherein a sequence transmitted within instances of the session protection signal is selected to at least in part configure the session protection signal.

6. The methods, apparatuses, and articles of clause 5, wherein the sequence provides a signature sequence protecting the receiving of the signal by the receiver device.

7. The methods, apparatuses, and articles of clause 5, wherein the receiver device comprises a device receiving ACK/NACK messages from the first transmitter device in the ongoing communication session, and wherein the sequence provides a signature sequence protecting communication of the ACK/NACK messages.

8. The methods, apparatuses, and articles of clause 5, wherein the receiver device comprises a device associated with a first RAT, and wherein the sequence provides a RAT specific signature configured to be detectable by devices associated with a second RAT.

9. The methods, apparatuses, and articles of clause 5, wherein the receiver device comprises a device associated with a first communication network operator, and wherein the sequence provides an operator specific signature configured to be detectable by devices associated with a second communication network operator.

10. The methods, apparatuses, and articles of any of clauses 1-9, wherein instances of the session protection signal includes a SRS transmission, a PUCCH transmission, or a RRS transmission.

11. The methods, apparatuses, and articles of any of clauses 1-10, further providing for receiving, by the receiver device from the first transmitter device, session protection signal configuration, wherein the transmitting the session protection signal during the ongoing communication session is in accordance with the session protection signal configuration.

12. The methods, apparatuses, and articles of clause 11, further providing for transmitting, by the receiver device to the first transmitter device, a request for session protection, wherein the session protection signal configuration is provided in response to the request for session protection.

13. The methods, apparatuses, and articles of clause 11, wherein the transmitting the session protection signal is mandated by the session protection signal configuration.

14. The methods, apparatuses, and articles of clause 11, wherein the transmitting the session protection signal is an option provided for by the session protection signal configuration.

15. The methods, apparatuses, and articles of clause 11, wherein the signal of the ongoing communication session comprises gaps, and wherein the session protection signal configuration configures the receiver device for transmission of the session protection signal within the gaps.

16. The methods, apparatuses, and articles of any of clauses 1-10, wherein the transmitting the session protection signal is autonomous by the receiver device without the first transmitter device providing gaps in the signal of the ongoing communication session for transmission of the session protection signal.

17. The methods, apparatuses, and articles of any of clauses 1-16, wherein the transmitting the session protection signal by the receiver device causes the first transmitter device to rate match around resources of the session protection signal.

18. The methods, apparatuses, and articles of any of clauses 1-17, wherein the session protection signal comprises a periodic signal having a periodicity selected to correspond to a contiguous contention period of a receiver assisted channel access procedure implemented by the second transmitter device.

19. The methods, apparatuses, and articles of clause 18, wherein the contiguous contention period comprises a first number (T1) of contention slots, wherein if a predetermined number (K) of the contention slots of a contiguous contention period is found to include the session protection signal the receiver assisted channel access procedure determines a channel medium to be busy.

20. The methods, apparatuses, and articles of clause 19, wherein the periodicity of the session protection signal is T1.

21. The methods, apparatuses, and articles of clause 19, wherein the periodicity of the session protection signal is a downsampled rate based upon T1.

22. The methods, apparatuses, and articles of clause 19, wherein a duration of instances of the session protection signal is at least K contention slots.

23. Methods, apparatuses, and articles for wireless communication may provide for determining, by a first transmitter device, that transmission is to be provided in a shared spectrum; monitoring, by the first transmitter device prior to transmitting in the shared spectrum, for a signal detectable during a contiguous contention period of a receiver assisted channel access procedure, wherein the contiguous contention period comprises a plurality (T1) of contiguous contention slots, and determining that the shared spectrum is unavailable for the transmission when the contiguous contention period is found to include the signal.

24. The methods, apparatuses, and articles of clause 23, wherein the monitoring for the signal is performed by the first transmitter device each time the first transmitter device attempts to access a channel using an updated beam direction.

25. The methods, apparatuses, and articles of any of clauses 23-24, wherein the updated beam direction comprises a beam direction to be utilized by the first transmitter device for initiating a communication session.

26. The methods, apparatuses, and articles of any of clauses 23-24, wherein the updated beam direction comprises a beam direction to be utilized by the first transmitter device for maintaining an ongoing communication session.

27. The methods, apparatuses, and articles of any of clauses 23-26, further providing for beamforming in the first beam direction, wherein the beamforming is used for the monitoring for the signal.

28. The methods, apparatuses, and articles of any of clauses 23-27, wherein the monitoring for the signal provides for monitoring at least T1 contiguous contention slots for the signal.

29. The methods, apparatuses, and articles of any of clauses 23-27, wherein the monitoring for the signal provides for monitoring a plurality of contiguous contention slots in the range of T1 contiguous contention slots to T2 contiguous contention slots, wherein T2 is greater than T1.

30. The methods, apparatuses, and articles of any of clauses 23-29, wherein the monitoring for the signal provides for monitoring for presence of the signal in at least a predetermined number (K) slots of the contiguous contention slots.

31. The methods, apparatuses, and articles of any of clauses 23-30, further providing for determining that the shared spectrum is unavailable for the transmission when the predetermined number (K) of the contention slots is found to include the signal.

32. The methods, apparatuses, and articles of clause 31, wherein the predetermined number (K) of the contention slots found to include the signal are contiguous.

33. The methods, apparatuses, and articles of clause 31, wherein the predetermined number (K) of the contention slots found to include the signal are non-contiguous.

34. The methods, apparatuses, and articles of any of clauses 30-33, further providing for determining that the shared spectrum is available for the transmission when less than the predetermined number (K) of the contention slots is found to include the signal.

35. The methods, apparatuses, and articles of any of clauses 23-34, wherein the monitoring for the signal provides for monitoring for a predefined energy pattern within the T1 contiguous contention slots.

36. The methods, apparatuses, and articles of any of clauses 23-35, wherein the signal comprises a session protection signal configured to provide receiver assisted transmitter sensing with respect to the first transmitter device.

37. The methods, apparatuses, and articles of clause 36, wherein the session protection signal is transmitted by a receiver device operating in an ongoing communication session between the receiver device and a second transmitter device.

38. The methods, apparatuses, and articles of any of clauses 36-37, wherein the session protection signal comprises a periodic signal having a periodicity corresponding to the contiguous contention period.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5 and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
receiving, by a receiver device from a first transmitter device, a signal of an ongoing communication session between the receiver device and the first transmitter device; and
transmitting, by the receiver device, a session protection signal during the ongoing communication session, wherein the session protection signal is configured to provide receiver assisted transmitter sensing with respect to a second transmitter device monitoring a contiguous contention period comprising a plurality (T1) of contiguous contention slots of a receiver assisted channel access procedure, and wherein the session protection signal comprises a plurality of signal instances transmitted by the receiver device and having a periodicity providing a downsampled rate based upon the plurality (T1) of contiguous contention slots of the contiguous contention period.

2. The method of claim 1, wherein the session protection signal comprises a periodic session protection signal having the periodicity selected to at least in part configure the periodic session protection signal to provide receiver assisted transmitter sensing in accordance with the receiver assisted channel access procedure.

3. The method of claim 1, wherein if a predetermined number (K) of slots of the contiguous contention period is found to include instances of the plurality of signal instances of the session protection signal the receiver assisted channel access procedure determines a channel medium to be busy, and wherein the predetermined number (K) comprises a plurality of slots of the plurality (T1) of contiguous contention slots.

4. The method of claim 3, wherein a periodicity of the session protection signal is a 2 times or greater multiple of T1.

5. The method of claim 3, wherein a duration of the plurality of signal instances of the session protection signal is at least K slots.

6. A method of wireless communication comprising:
determining, by a first transmitter device, that transmission is to be provided in a shared spectrum;
monitoring, by the first transmitter device prior to transmitting in the shared spectrum, for a signal detectable during a contiguous contention period of a receiver assisted channel access procedure, wherein the contiguous contention period comprises a plurality (T1) of contiguous contention slots, and wherein the signal comprises a plurality of signal instances transmitted by a potential victim receiver and having a periodicity providing a downsampled rate based upon the plurality (T1) of contiguous contention slots of the contiguous contention period; and
determining that the shared spectrum is unavailable for the transmission when the contiguous contention period is found to include the signal.

7. The method of claim 6, wherein the monitoring for the signal is performed by the first transmitter device each time the first transmitter device attempts to access a channel using an updated beam direction.

8. The method of claim 7, wherein the updated beam direction comprises a beam direction to be utilized by the first transmitter device for initiating a communication session.

9. The method of claim 7, wherein the updated beam direction comprises a beam direction to be utilized by the first transmitter device for maintaining an ongoing communication session.

10. The method of claim 6, wherein the monitoring for the signal comprises:
monitoring at least T1 contiguous contention slots for the signal.

11. The method of claim 6, wherein the monitoring for the signal comprises:
monitoring for presence of instances of the plurality of signal instances in at least a predetermined number (K) of the contiguous contention slots, wherein the predetermined number (K) comprises a plurality of slots of the contiguous contention slots.

12. The method of claim 11, further comprising:
determining that the shared spectrum is unavailable for the transmission when the predetermined number (K) of the contiguous contention slots is found to include the signal instances.

13. The method of claim 11, further comprising:
determining that the shared spectrum is available for the transmission when less than the predetermined number (K) of the contiguous contention slots is found to include the signal instances.

14. The method of claim 6, wherein the signal comprises a session protection signal configured to provide receiver assisted transmitter sensing with respect to the first transmitter device.

15. An apparatus for wireless communication comprising:
a processor;
a memory coupled with the processor; and
instructions stored in the memory and executable by the processor to cause the apparatus to:
receive, by a receiver device from a first transmitter device, a signal of an ongoing communication session between the receiver device and the first transmitter device; and
transmit, by the receiver device, a session protection signal during the ongoing communication session, wherein the session protection signal is configured to provide receiver assisted transmitter sensing with respect to a second transmitter device monitoring a contiguous contention period comprising a plurality (T1) of contiguous contention slots of a receiver assisted channel access procedure, and wherein the session protection signal comprises a plurality of signal instances transmitted by the receiver device and having a periodicity providing a downsampled rate based upon the plurality (T1) of contiguous contention slots of the contiguous contention period.

16. The apparatus of claim 15, wherein the session protection signal comprises a periodic session protection signal having the periodicity selected to at least in part configure the periodic session protection signal to provide receiver assisted transmitter sensing in accordance with the receiver assisted channel access procedure.

17. The apparatus of claim 15, wherein if a predetermined number (K) of slots of the contiguous contention period is found to include instances of the plurality of signal instances of the session protection signal the receiver assisted channel access procedure determines a channel medium to be busy, and wherein the predetermined number (K) comprises a plurality of slots of the plurality (T1) of contiguous contention slots.

18. The apparatus of claim 17, wherein a periodicity of the session protection signal is a 2 times or greater multiple of T1.

19. The apparatus of claim 17, wherein a duration of the plurality of signal instances of the session protection signal is at least K slots.

20. An apparatus for wireless communication comprising:
a processor;
a memory coupled with the processor; and
instructions stored in the memory and executable by the processor to cause the apparatus to:
determine, by a first transmitter device, that transmission is to be provided in a shared spectrum;
monitor, by the first transmitter device prior to transmitting in the shared spectrum, for a signal detectable during a contiguous contention period of a receiver assisted channel access procedure, wherein the contiguous contention period comprises a plurality (T1) of contiguous contention slots, and wherein the signal comprises a plurality of signal instances transmitted by a potential victim receiver and having a periodicity providing a downsampled rate based upon the plurality (T1) of contiguous contention slots of the contiguous contention period; and
determine that the shared spectrum is unavailable for the transmission when the contiguous contention period is found to include the signal.

21. The apparatus of claim 20, wherein monitoring for the signal is performed by the first transmitter device each time the first transmitter device attempts to access a channel using an updated beam direction.

22. The apparatus of claim 21, wherein the updated beam direction comprises a beam direction to be utilized by the first transmitter device for initiating a communication session.

23. The apparatus of claim 21, wherein the updated beam direction comprises a beam direction to be utilized by the first transmitter device for maintaining an ongoing communication session.

24. The apparatus of claim 20, wherein the instructions causing the apparatus to monitor for the signal cause the apparatus to:
monitor at least T1 contiguous contention slots for the signal.

25. The apparatus of claim 20, wherein the instructions causing the apparatus to monitor for the signal cause the apparatus to:
monitor for presence of instances of the plurality of signal instances in at least a predetermined number (K) of the contiguous contention slots, wherein the predetermined number (K) comprises a plurality of slots of the contiguous contention slots.

26. The apparatus of claim 25, wherein the instructions further cause the apparatus to:
determine that the shared spectrum is unavailable for the transmission when the predetermined number (K) of the contiguous contention slots is found to include the signal instances.

27. The apparatus of claim 25, wherein the instructions further cause the apparatus to:
determine that the shared spectrum is available for the transmission when less than the predetermined number (K) of the contiguous contention slots is found to include the signal instances.

28. The apparatus of claim 20, wherein the signal comprises a session protection signal configured to provide receiver assisted transmitter sensing with respect to the first transmitter device.

* * * * *